(12) United States Patent
Obara

(10) Patent No.: US 9,470,533 B2
(45) Date of Patent: Oct. 18, 2016

(54) MAP DISTRIBUTION SERVER FOR AUTOMOTIVE NAVIGATION SYSTEMS, MAP DATA DISTRIBUTION SYSTEM, AND ROAD DIFFERENCE DATA PRODUCTION METHOD

(71) Applicant: Hitachi, Ltd., Tokyo (JP)

(72) Inventor: Kiyohiro Obara, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 50 days.

(21) Appl. No.: 14/141,072

(22) Filed: Dec. 26, 2013

(65) Prior Publication Data

US 2014/0188386 A1 Jul. 3, 2014

(30) Foreign Application Priority Data

Dec. 28, 2012 (JP) .................................. 2012-288085

(51) Int. Cl.
*G01C 21/26* (2006.01)
*G01C 21/32* (2006.01)
*G01C 21/36* (2006.01)

(52) U.S. Cl.
CPC ............... *G01C 21/26* (2013.01); *G01C 21/32* (2013.01); *G01C 21/367* (2013.01)

(58) Field of Classification Search
CPC .... G01C 21/32; G01C 21/26; G01C 21/367; G06F 17/30241; G09B 29/10
USPC ........................................................ 701/532
See application file for complete search history.

(56) References Cited

U.S. PATENT DOCUMENTS 6,880,016 B1 * 4/2005 Van Der Heijden et al. ............................. 709/230
2004/0177062 A1 * 9/2004 Urquhart et al. ................. 707/3
(Continued)

FOREIGN PATENT DOCUMENTS

| JP | 2007-241003 A | 9/2007 |
| JP | 2008-090195 A | 4/2008 |
| WO | WO 2006/011278 A1 | 2/2006 |

*Primary Examiner* — Behrang Badii
*Assistant Examiner* — Daniel L Greene
(74) *Attorney, Agent, or Firm* — Foley & Lardner LLP

(57) ABSTRACT

Automotive navigation map data has a multilevel structure in which links have a relationship of association with one another among the minutest level and upper levels that are different from the minutest level in scale. A lowermost-level translation unit uses as original data items old and new RDB-form map data items of the minutest level to produce RDB-form difference data of the minutest level. An upper-level difference translation unit produces CSV-format data of a difference of each of the levels of the multilevel structure on the basis of CSV-format data, into which the difference data of the minutest level is translated, and information on the relationship of association among the links of the upper and lower levels in the automotive navigation map data, and integrates the difference data items as final map difference data for an automotive navigation map.

15 Claims, 13 Drawing Sheets

(56) References Cited

U.S. PATENT DOCUMENTS

| | | | |
|---|---|---|---|
| 2005/0021522 A1* | 1/2005 | Herman et al. | 707/10 |
| 2006/0259456 A1* | 11/2006 | Falk et al. | 707/2 |
| 2007/0213929 A1 | 9/2007 | Tanizaki et al. | |
| 2008/0086262 A1* | 4/2008 | Asahara et al. | 701/208 |
| 2008/0147308 A1* | 6/2008 | Howard et al. | 701/200 |
| 2008/0147321 A1* | 6/2008 | Howard et al. | 701/211 |
| 2008/0215240 A1* | 9/2008 | Howard et al. | 701/213 |
| 2009/0019095 A1* | 1/2009 | Asahara et al. | 707/203 |
| 2011/0269424 A1* | 11/2011 | Multer et al. | 455/411 |
| 2011/0276263 A1* | 11/2011 | Shimotani et al. | 701/200 |
| 2013/0076766 A1* | 3/2013 | Yamagishi | 345/522 |
| 2014/0188386 A1* | 7/2014 | Obara | 701/532 |

* cited by examiner

FIG. 2

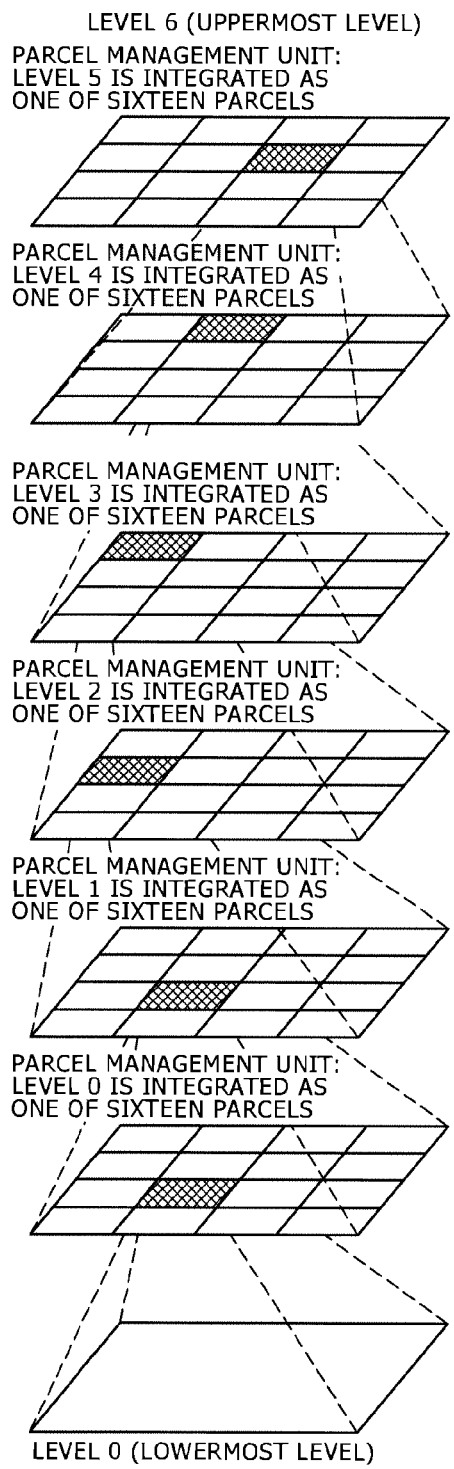

LEVEL 6 (UPPERMOST LEVEL)

PARCEL MANAGEMENT UNIT:
LEVEL 5 IS INTEGRATED AS
ONE OF SIXTEEN PARCELS

PARCEL MANAGEMENT UNIT:
LEVEL 4 IS INTEGRATED AS
ONE OF SIXTEEN PARCELS

PARCEL MANAGEMENT UNIT:
LEVEL 3 IS INTEGRATED AS
ONE OF SIXTEEN PARCELS

PARCEL MANAGEMENT UNIT:
LEVEL 2 IS INTEGRATED AS
ONE OF SIXTEEN PARCELS

PARCEL MANAGEMENT UNIT:
LEVEL 1 IS INTEGRATED AS
ONE OF SIXTEEN PARCELS

PARCEL MANAGEMENT UNIT:
LEVEL 0 IS INTEGRATED AS
ONE OF SIXTEEN PARCELS

LEVEL 0 (LOWERMOST LEVEL)

200

LEVEL 6:

| BLOCK MANAGEMENT UNIT | 65536×1×1=65,536 REFERENCE PARCELS |
|---|---|
| BLOCK MANAGEMENT UNIT | 65,536 REFERENCE PARCELS |
| NUMBER OF BLOCKS TO BE MANAGED | 1 |

THE NUMBER OF BLOCKS TO BE MANAGED IS ONE

LEVEL 5:

| BLOCK MANAGEMENT UNIT | 4096×4×4=65,536 REFERENCE PARCELS |
|---|---|
| BLOCK MANAGEMENT UNIT | 4,096 REFERENCE PARCELS |
| NUMBER OF BLOCKS TO BE MANAGED | 16 |

THE NUMBER OF BLOCKS TO BE MANAGED IS ONE

LEVEL 4:

| BLOCK MANAGEMENT UNIT | 256×16×16=65,536 REFERENCE PARCELS |
|---|---|
| BLOCK MANAGEMENT UNIT | 256 REFERENCE PARCELS |
| NUMBER OF BLOCKS TO BE MANAGED | 256 |

THE NUMBER OF BLOCKS TO BE MANAGED IS ONE

LEVEL 3:

| BLOCK MANAGEMENT UNIT | 16×16×16=4,096 REFERENCE PARCELS |
|---|---|
| BLOCK MANAGEMENT UNIT | 16 REFERENCE PARCELS |
| NUMBER OF BLOCKS TO BE MANAGED | 256 |

LEVEL 2:

| BLOCK MANAGEMENT UNIT | 1×32×32=1,024 REFERENCE PARCELS |
|---|---|
| BLOCK MANAGEMENT UNIT | 1 REFERENCE PARCEL |
| NUMBER OF BLOCKS TO BE MANAGED | 1,024 |

LEVEL 1:

| BLOCK MANAGEMENT UNIT | 1/16×32×32=64 REFERENCE PARCELS |
|---|---|
| BLOCK MANAGEMENT UNIT | 1/16 REFERENCE PARCELS |
| NUMBER OF BLOCKS TO BE MANAGED | 1,024 |

LEVEL 0:

| BLOCK MANAGEMENT UNIT | 1/256×32×32=4 REFERENCE PARCELS |
|---|---|
| BLOCK MANAGEMENT UNIT | 1/256 REFERENCE PARCELS |
| NUMBER OF BLOCKS TO BE MANAGED | 1,024 |

OUTLINE OF DIFFERENCE DATA CREATION PROCESS

FIG.4A

TABLE STRUCTURE FOR LINK SHAPE ~400

| LINK ID | LEADING NODE ID | TERMINAL NODE ID | SHAPE COORDINATE POINT STRING |
|---------|-----------------|------------------|-------------------------------|
| link1   | node1           | node2            | —                             |
| link2   | node2           | node3            | ～                            |
| link3   | node3           | node4            | —                             |
| ...     | ...             | ...              | ...                           |

FIG.4B

TABLE STRUCTURE FOR TRAFFIC REGULATION INFORMATION

| LINK ID | TRAFFIC REGULATION INFORMATION |
|---------|-------------------------------|
| link2   | ONE-WAY STREET                |
| link4   | ONE-WAY STREET                |
| ...     | ...                           |

TABLE STRUCTURE FOR WIDTH INFORMATION

| LINK ID | WIDTH INFORMATION |
|---------|-------------------|
| link1   | 10m               |
| link2   | 5m                |
| link3   | 10m               |
| ...     | ...               |

TABLE STRUCTURE FOR ROAD NAME

| LINK ID | ROAD NAME |
|---------|-----------|
| link1   | ROAD A    |
| link2   | ROAD A    |
| link3   | ROAD A    |
| ...     | ...       |

TABLE STRUCTURE FOR MISCELLANEOUS ROAD ATTRIBUTE

| LINK ID | ROAD ATTRIBUTE          |
|---------|-------------------------|
| link1   | OPEN NATIONAL ROAD, —   |
| link2   | OPEN NATIONAL ROAD, —   |
| link3   | MAJOR LOCAL ROAD, —     |
| ...     | ...                     |

TABLE STRUCTURE FOR LINK SHAPE 500

| LINK ID | LEADING NODE ID | TERMINAL NODE ID | SHAPE COORDINATE POINT STRING |
|---|---|---|---|
| link1 | node1 | node2 | |
| link2 | node2 | node3 | |
| link3 | node3 | node4 | |
| ... | ... | ... | ... |

FIG.5B

TABLE STRUCTURE FOR TRAFFIC REGULATION INFORMATION

| LINK ID | TRAFFIC REGULATION INFORMATION |
|---|---|
| link2 | ONE-WAY STREET |
| ... | ... |

TABLE STRUCTURE FOR WIDTH INFORMATION

| LINK ID | WIDTH INFORMATION |
|---|---|
| link1 | 10m |
| link2 | 5m |
| link3 | 10m |
| ... | ... |

TABLE STRUCTURE FOR ROAD NAME

| LINK ID | ROAD NAME |
|---|---|
| link1 | ROAD A |
| link2 | ROAD A |
| link3 | ROAD A |
| ... | ... |

TABLE STRUCTURE FOR MISCELLANEOUS ROAD ATTRIBUTE

| LINK ID | ROAD ATTRIBUTE |
|---|---|
| link1 | OPEN NATIONAL ROAD, − |
| link2 | OPEN NATIONAL ROAD, − |
| link3 | MAJOR LOCAL ROAD, − |
| ... | ... |

DIFFERENCE DATA FORMAT (EXAMPLE OF ROAD LINK)

LINK ID, SHAPE INFORMATION, TRAFFIC REGULATION INFORMATION, WIDTH INFORMATION, ROAD NAME, ETC.

FIG.7B

DIFFERENCE DATA FILE (EXAMPLE OF ROAD LINK)

2,     0x008e000000615887,     NULL, , ,

LINK ID | SHAPE INFORMATION | TRAFFIC REGULATION INFORMATION

| LEVEL0 LINK ID | LEVEL1 LINK ID | LEVEL2 LINK ID | ... | LEVEL6 LINK ID |
|---|---|---|---|---|
| link1 | link11 | link21 | ... | link61 |
| link2 | link11 | link21 | ... | link61 |
| link3 | link13 | link21 | ... | link61 |
| link4 | link13 | link21 | ... | link61 |
| ... | ... | ... | ... | ... |

1200

| LEVEL0 LINK ID | LEVEL1 LINK ID | LEVEL2 LINK ID | ... | LEVEL6 LINK ID |
|---|---|---|---|---|
| link1 | link11 | NULL | ... | NULL |
| link2 | link11 | NULL | ... | NULL |
| link3 | link13 | NULL | ... | NULL |
| link4 | link13 | NULL | ... | NULL |
| ... | ... | ... | ... | ... |

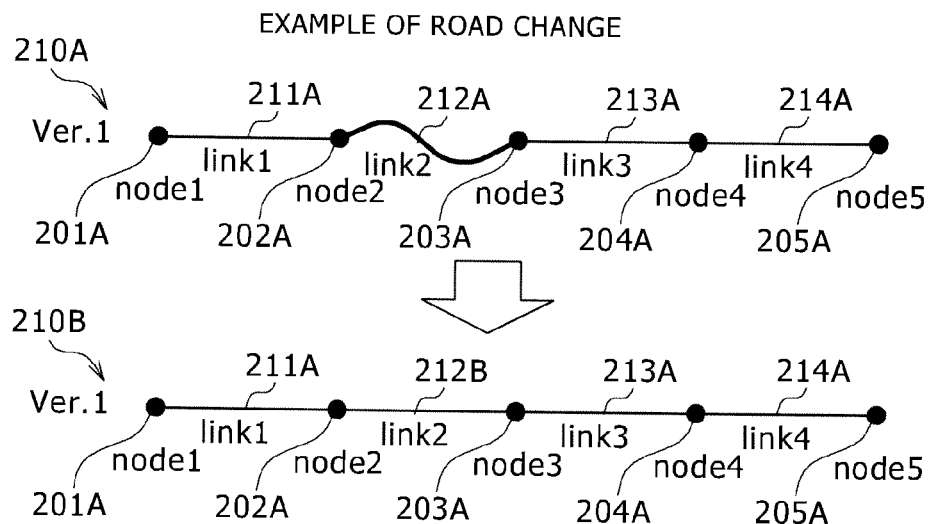

MAP DISTRIBUTION SERVER FOR AUTOMOTIVE NAVIGATION SYSTEMS, MAP DATA DISTRIBUTION SYSTEM, AND ROAD DIFFERENCE DATA PRODUCTION METHOD

CLAIM OF PRIORITY

This application claims priority to Japanese Patent Application No. 2012-288085 filed on Dec. 28, 2012.

BACKGROUND

The present invention relates to a map distribution server for automotive navigation systems, a map data distribution system, and a road difference data production method. More particularly, the present invention is concerned with a production system and method for automotive navigation systems for producing difference update data in compliance with addition of a new road or modification or deletion of an attribute of an existing road.

In automotive navigation systems, a map is displayed on a screen in order to support a user's designating a destination or a route or to assist a user in finding a vehicle moving route to a designated destination. Thus, an automotive navigation map is used for various purposes. Map data for the automotive navigation system is preserved in the form of a database in a storage medium. Information on a road newly constructed after the storage medium is manufactured or information on modification or deletion of an attribute of an existing road has to be updated from time to time. As one means for making such update data of the automotive navigation system map available to a user, there is a method of utilizing a service which an automotive navigation map provision vendor renders over a communication network.

Patent documents 1 to 3 (Japanese Unexamined Patent Application Publications Nos. 2008-90195 and 2007-241003, and Written Opinion (WO) No. 2006/011278 A1) have disclosed distribution systems for map update data to be organized by such automotive map provision vendors.

According to a map data distribution system described in the patent document 1, those out of plural link data items to be updated, which are interconnected as a network, are managed as one map update data. If updating map data of a designated area is requested, the map data is updated with map update data that is at least partly concerned with the area. Accordingly, while the connectivity of the updated road network is guaranteed, a data size to be communicated for updating can be decreased.

According to a map updating system described in the patent document 2, if updating map data of a designated area is requested, difference update data of the designated area and update data on which the difference update data depends are specified. The data items are updated in chronological order. Accordingly, while an amount of update data is suppressed, map data of a desired area can be updated to the latest, and the consistency of the designated area with an adjoining area whose data is not updated can be sustained.

According to a map data distribution system described in the patent document 3, information on a date when link data is updated, and information on a range which is affected by the updating are preserved in a server in relation to each link. If a terminal requests updating of map data of a designated area, the server transmits links in the area to the terminal, and also transmits to the terminal data of a link, which has been updated after a previous updating request is issued, out of links that are affected by the updating of the links in the area. Accordingly, occurrence of unnecessary communication traffic can be suppressed, and map data can be updated so as not to bring about an inconsistency in an updated map.

SUMMARY

However, in an existing map update data creation system, it takes much time for a user to receive update data of a road after the road has been changed. If a road has been changed, map data of a relational database (RDB) form (hereinafter, RDB map data) is provided as original data by a map dealer (original data provision vendor). An automotive navigation map provision vendor creates an RDB map of an entire nation, obtains a difference between new and old RDB maps, and creates difference data for an automotive navigation map, which is dedicated to automotive navigation systems, on the basis of the difference. Therefore, it takes much time to prepare difference update data in case a new road is constructed or a road is changed.

Referring to FIG. 13 and FIG. 14, an example of an existing update data creation system for an automotive navigation map will be described below. FIG. 13 shows the example of the existing update data creation system for an automotive navigation map, and FIG. 14 shows the structure of the map data.

An original data provision vendor 01 provides an automotive navigation map difference data provision vendor 10 with original data version 1 (ver. 1) of level 0 using a storage medium (1301). The original data is provided as data of a relational database (RDB) form. An automotive navigation map difference data provision vendor 10 compiles the original data (RDB) so as to produce a hierarchical automotive navigation map ver. 1 (1311), and distributes the automotive navigation map to an automotive navigation vendor or an automotive navigation device 20 over a communication network or the like. The automotive navigation map is preinstalled in the automotive navigation device (1321). The automotive navigation map data is binary data (variable-length data) intended to optimize a capacity or access rate. Thereafter, the original data provision vendor 01 provides the automotive navigation map difference data provision vendor 10 with original data version 2 (ver. 2) (RDB) of level 0 which is of a time-sequentially new generation and is obtained by updating the original data ver. 1 (1302). The automotive navigation map difference data provision vendor 10 compiles the original data (RDB) so as to produce a hierarchical automotive navigation map (binary data) ver. 2 (1312), further creates hierarchical difference data (binary data) between the compiled automotive navigation maps ver. 1 and ver. 2 of the two generations (1313), and distributes the difference data to the automotive navigation vendor or automotive navigation device 20. In the automotive navigation device, the preinstalled automotive navigation map ver. 1 (1322) is updated into a new hierarchical automotive navigation map (binary data) ver. 2 on the basis of the hierarchical difference data (1323).

Assume that a road link has been changed as shown in FIG. 14A and FIG. 14C. As for unchanged road links ver. 1, a straight-line road 210A shall include end nodes 201A and 205A, intermediate nodes 202A, 203A, and 204A, and links 1, 2, 3, and 4 211A, 212A, 213A and 214A which link the nodes. Among the links, only the link 212A has a curve. As for road links ver. 2 resulting from the change, the link 2 212A has been changed into a straight-line road, and a one-way regulation has been lifted.

FIG. 14B shows an example of a data structure 1400 (binary data) for one link. To each of road links included in an automotive navigation map, pieces of information such as a shape and a traffic regulation as well as pieces of information such as a road type, a link length, and a road width classification are appended as road attributes according to a code. According to FIG. 14A and FIG. 14C, the structure and attribute of the link 2 are changed between the road links ver. 1 and road links ver. 2.

Since the automotive navigation map data 1400 has the foregoing structure, it is necessary to obtain the difference between the binary data items for the purpose of learning the difference between the maps ver. 1 and ver. 2. For switching the data items, aside from the original binary data ver. 1 (1311), new binary data (1312) ver. 2 has to be created once.

As for data 1404 of the links ver. 2 shown in FIG. 14C, the length of data of a new link 2 is needed in order to substitute the new link 2 for the old one.

However, elements of original data (RDB) provided by a map dealer are not associated with elements of automotive navigation map data (binary data) on a one-to-one basis. In the case of the automotive navigation map data, one automotive navigation map data element (for example, a road link) is formed with plural original data elements. For example, data of one road link in map data (1402 or 1404) in FIG. 14C is formed with a shape element, road width element, road name element, etc. included in original data (RDB 1301 or RDB 1302). Accordingly, merely by working out the difference between the original data items provided by the map dealer, hierarchical difference data for an automotive navigation map cannot be created.

Thus, it takes much time until the automotive navigation map provision vendor 10 creates an RDB map of an entire nation and further creates update data for the automotive navigation map after the automotive navigation map provision vendor 10 receives original data items (RDBs) from the original data provision vendor 01. Therefore, if a new road is constructed or a road is changed, the information cannot be immediately provided for users. For example, the time that is on the order of one week is needed to create the RDB map data of the entire nation, and the time that is on the order of several days is needed to create the difference update data. Accordingly, a considerable number of days is needed for the automotive navigation map provision vendor to distribute updated map data to users.

An object of the present invention is to provide an updating method and updating system for an automotive navigation system map which can create difference update data of automotive navigation map data for a short period of time in case a new road is added or a road is changed.

A typical example of the present invention will be described below. A map distribution server that produces automotive navigation map data for automotive navigation systems includes a lowermost-level difference translation unit and an upper-level difference translation unit. The automotive navigation map is represented by network data in which roads are expressed with links and intersections are expressed with nodes. The automotive navigation map data has a multilevel structure in which the links have a relationship of association with one another among the minutest level and upper levels that are different from the minutest level in scale. The lowermost-level difference translation unit uses new and old RDB-form map data items of the minutest level as original data items to produce RDB-form difference data of the minutest level. The upper-level difference translation unit produces translation data of a difference of each of the levels of the multilevel structure on the basis of data, into which the difference data of the minutest level is translated, and information on the relationship of association among the links of the upper and lower levels of the automotive navigation map data, and integrates the translation data items as final map difference data for the automotive navigation map.

According to the present invention, difference update data stemming from addition of a new road to an automotive navigation map or change of a road in the map can be created for a short period of time, and provided for users of automotive navigation systems.

BRIEF DESCRIPTION OF THE DRAWINGS

FIG. 2 is a diagram showing an example of a hierarchical structure of automotive navigation map data;

FIG. 4A to FIG. 4E are diagrams showing examples of table structures for original data ver. 1 (RDB) and examples of contents;

FIG. 5A to FIG. 5E are diagrams showing examples of table structures for original data ver. 2 (RDB) and examples of contents;

FIG. 7A is a diagram showing a format of difference data derived from change of a road link, and FIG. 7B is a diagram showing a file of difference data that is CSV-file format data;

FIG. 10 is a diagram showing an example of an upper/lower-level link association table stemming from the processing performed by the upper-level difference translation unit;

FIG. 14A to FIG. 14C are diagrams showing examples of structures of data (binary data) of one link to be created by the system shown in FIG. 13.

DETAILED DESCRIPTION

Figure 1:
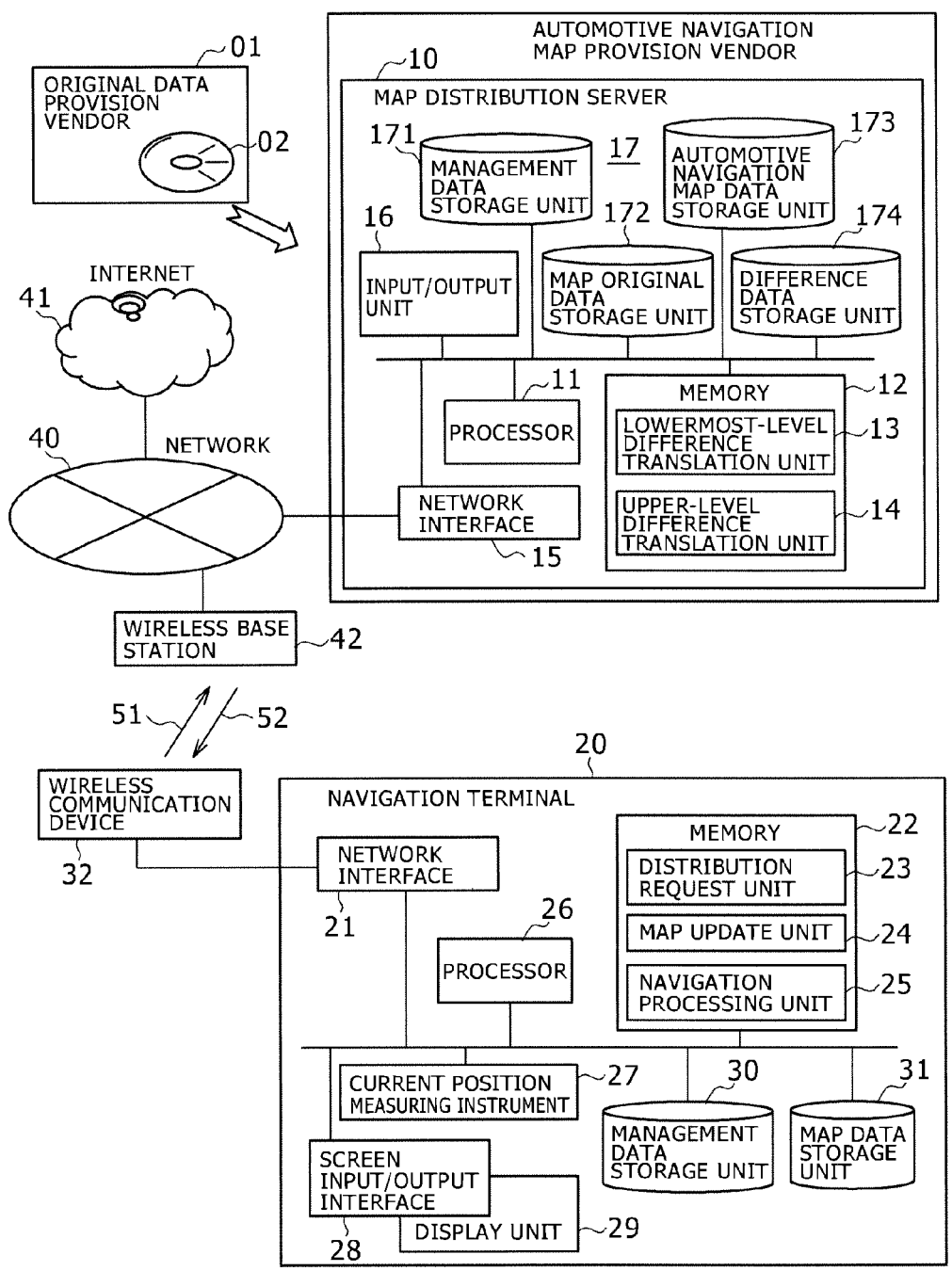
FIG. 1 is a schematic diagram of a map data distribution system in accordance with a first embodiment of the present invention.

Referring to the drawings, embodiments of a map data distribution system of the present invention will be described below.

First Embodiment

Referring to the drawings, a map data distribution system in accordance with a first embodiment of the present invention will be described below.

FIG. 1 is a schematic diagram of the map data distribution system in accordance with the first embodiment. The map data distribution system of the present invention includes a map distribution server 10 owned by an automotive navigation map provision vendor, an automotive navigation terminal 20, and a network 40 and the Internet 41 over which the map distribution server and automotive navigation terminal are coupled to each other. A wireless communication device 32 is coupled to the navigation terminal 20. Owing to the wireless communication device 32, the automotive navigation terminal 20 is coupled onto the network 40 and Internet 41 by way of a wireless base station 42. The wireless communication device 32 may be incorporated in the automotive navigation terminal 20. The map distribution server 10 distributes an updated part of map data to the navigation terminal 20 in response to a map distribution request received from the navigation terminal 20.

The map distribution server 10 includes a processor 11, a memory 12, a network interface 15, an input/output unit 16, and a storage device 17. In the memory 12, plural programs are preserved. As features to be implemented by running the programs in a computer, at least a lowermost-level difference translation unit 13 and an upper-level difference translation unit 14 are available.

The storage device 17 includes a management data storage unit 171, a map original data storage unit 172, an automotive navigation map data storage unit 173, and a difference data storage unit 174.

In the map original data storage unit 172, link data items of respective links forming each of roads in a map are stored. In addition, original data items (RDBs) of the minutest level (level 0) of two different generations that are provided using a recording medium 02 such as a CD-ROM or DVD-ROM by a map dealer (original data provision vendor) 01 are preserved. The map distribution server 10 produces automotive navigation map data ver. 1, which is conformable to, for example, the KIWI format (see FIG. 2) and specialized in automotive navigation, using primary original data ver. 1, and preserves the automotive navigation map data in the automotive navigation map data storage unit 173 according to a predetermined format. The automotive navigation map data ver. 1 may be provided by a third party. A difference between old and new original data items ver. 1 and ver. 2 of the minutest level is translated in order to produce hierarchical difference data for automotive navigation, and the difference data is preserved in the difference data storage unit 174. Pieces of map information preserved in the difference data storage unit 174 include a difference update management data table and a difference data table which are concerned with the difference data. As for the pieces of information concerning the difference data, difference data (map difference data) representing a difference between a previous map and the latest map is described in the same format as the automotive navigation map data is with a feature that a component of a map (link, inductive guidance information, vehicle information and communication system (VICS, registered trademark) information, information on association with wide-area map data, etc.) used as a unit.

The automotive navigation terminal 20 includes a network interface 21 via which the automotive navigation terminal 20 is coupled onto the network 40, a memory 22, a processor 26, a current position measuring instrument 27, a screen input/output interface 28 and a display unit 29 that include a graphical user interface (GUI), and a storage device. In the memory 22, plural programs are preserved. As features to be implemented by running the programs in a computer, at least a distribution request unit 23, a map update unit 24, and a navigation processing unit 25 are available. The storage device includes a management data storage unit 30 and a map data storage unit 31. In the map data storage unit 31, automotive navigation map data ver. 1 is primarily preserved.

The automotive navigation terminal 20 uses the latest automotive navigation map data which the automotive navigation terminal itself holds, and information, which is provided by the current position measuring instrument 27, to implement a navigation feature based on a user instruction entered via the screen input/output interface 28. For example, an automotive navigation map is displayed on the display unit 29 in order to perform navigation, that is, to support a user's finding a moving route or setting or changing a route, guide a user along a route while the user is actually moving an automobile. In addition, the automotive navigation terminal 20 transmits a map distribution request 51, which includes designation of an area for which map distribution is requested, and designation of a previous request date for the area, to the map distribution server 10 so as to obtain difference data (update elements) 52 of a map from the map distribution server 10. The automotive navigation terminal 20 preserves the difference data in the map data storage unit 31 and performs update processing for reflecting the difference data on own automotive navigation map data. Specifically, the navigation terminal 20 has the capability to update link data of an object-of-update area out of the map data into the latest data. When the navigation terminal 20 is instructed to update a map of a designated area (object-of-update area) by a user through the display unit 29 or via the screen input/output interface 28, the navigation terminal 20 requests the map distribution server 10 for difference data of the map which is necessary to update the area. The navigation terminal 20 rewrites the data preserved in the map data storage unit 31 in response to a processing instruction included in the map difference data obtained from the map distribution server 10, whereby the map data of the object-of-update area can be updated.

The automotive navigation terminal 20 may be provided with map difference data (update elements) 52 by the automotive navigation map provision vendor in offline, that is, by means of a recording medium such as a CD-ROM or DVD-ROM. Based on the difference data thus provided by the automotive navigation map provision vendor, automotive navigation map data ver. 1 is updated or overwritten, and the resultant automotive navigation map data ver. 2 is preserved in the map data storage unit 31. Pieces of map information to be preserved in the automotive navigation map data storage unit 173 or map data storage unit 31 have a hierarchical structure in which the pieces of map information are meshed scale by scale.

FIG. 2 shows an example of a hierarchical structure of automotive navigation map data 200 conformable to the KIWI format. In this example, the automotive navigation map data 200 has a seven-level structure ranging from level 0 (the minutest level or lowermost level) to level 6 (uppermost level) which are different from one another in terms of a scale. Each meshed map information is divided according a predetermined management unit, that divided into, for example, parcels that are rectangular areas including a hatched area. For example, level 1 has level 0, which is the lowermost level (minutest level), integrated as one of sixteen parcels.

Road data included in map data that is the automotive navigation map data 200 has a data structure in which links signifying roads each of which extends from an intersection to another intersection, and nodes signifying the intersections are networked. Each of the nodes is assigned an ID number. Map data of each level is divided into parcels and assigned an ID number. The map data can be updated in units of the area of the parcel. Since a map is thus divided into portions of a certain size, the automotive navigation map can be updated in units suitable for each purpose. Namely, for example, only an area in the map encompassing a current location can be updated or only areas encompassing a route can be updated.

Specifically, pieces of map information preserved in the automotive navigation map data storage unit 173 or map data storage unit 31 include a link data table and a node data table which are described according to a predetermined format. Each of the tables includes the same numbers of mesh IDs and records as the number of meshes belonging to an area. Herein, each of the records corresponds to link data or node data of a link or node existent in each of the meshes. Each of the records in the link data table includes a field in which a numerical link ID with which a link is identified is specified, a field in which an area ID of an area to which the link belongs is registered, a field in which the width of the link is registered, a field in which a type flag representing a road type of the link such as an open road or toll road is registered, a field in which point-string data that is coordinate data of a point string (leading node, terminal node, and intermediate node existent at a deflecting point of the link) indicating the shape of the link is registered, a field in which a node ID assigned to the leading node of the link is registered, and a field in which a node ID assigned to the terminal node of the link is registered.

The node data table for recording nodes includes records of node data items. Each of the records has a field in which a node ID with which a node is identified is registered, a field in which an area ID with which an area in which the node is located is identified is registered, a field in which coordinate data of the node is registered, a field in which a link ID of a link having the node as a leading node or terminal node is registered.

In the difference data storage unit 174 or map data storage unit 31, a difference update management data table or a difference data table that is concerned with difference data is preserved. Each of records in the difference update management data table has a field in which a difference data ID that is identification information on difference data is registered, a field in which a map area (mesh ID string) in which a feature represented by difference data exists is registered, and a field in which a path (storage destination address) to difference update data is registered. Further, the record includes a field in which a date of update of difference data is registered. The difference data table is a table that lists one or more link update data items. The link update data includes as one of records of the difference data table pieces of information such as an update type, a link ID, a width, a type flag, a point string data, a leading node, and a terminal node. Based on the update type and other pieces of information included in the difference data table, automotive navigation map data ver. 1 is updated or overwritten, and a link is added to, deleted from, or corrected in the automotive navigation map data. Thus, automotive navigation map data ver. 2 ensues.

The automotive navigation map data 200 includes, in addition to road data, background data and character data. Aside from the map data, route calculation data, route guidance data, image data, audio data, index data, and other various kinds of data items necessary to implement an automotive navigation feature are included. For example, the route calculation data includes link information on a road network.

Once the link data table and node data table are referenced, whether roads are linked to each other can be decided by checking if two road links share the same node ID. The fact that plural road links share the same node ID signifies that the roads are linked to each other. By checking the linkage of roads, a route can be explored, that is, which road should be passed intermediately in order to go from a certain road to another road can be determined.

Figure 3:
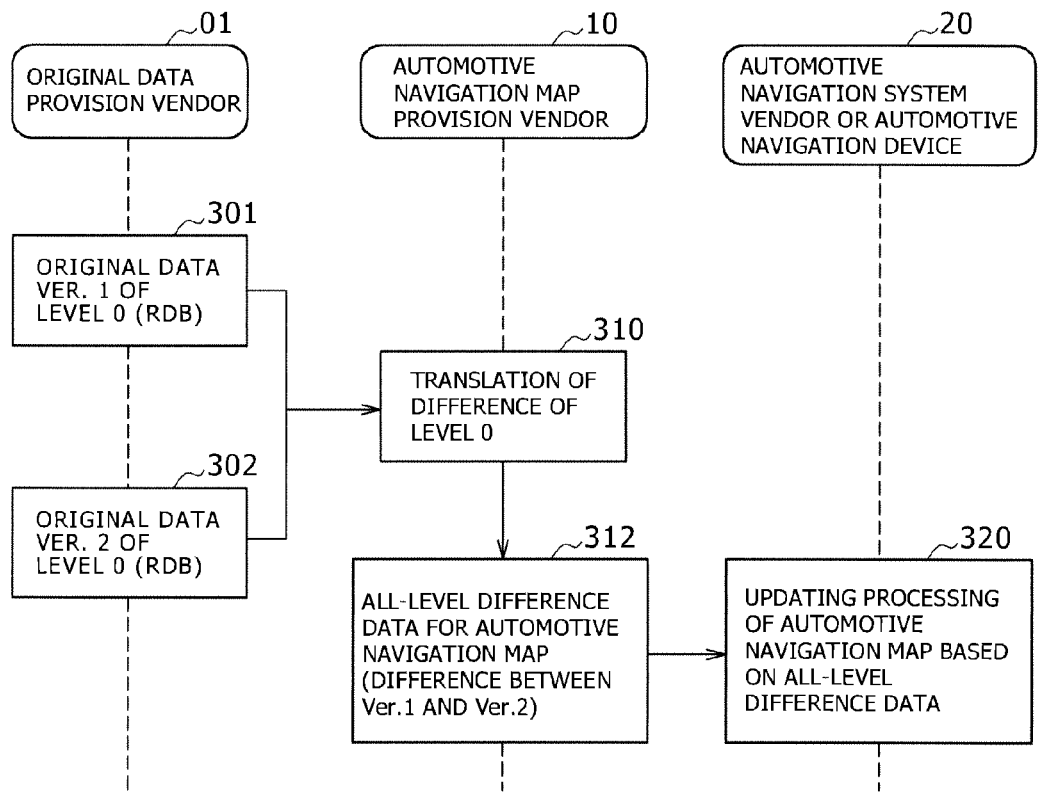
FIG. 3 is a diagram showing an outline of a difference data creation process in a map distribution server shown in FIG. 1.

FIG. 3 shows an outline of a process for difference data creation in the map distribution server 10 shown in FIG. 1. Original data ver. 1 of level 0 (RDB) is provided by the original data provision vendor 01 (301). Thereafter, original data ver. 2 of level 0 (RDB) into which the data ver. 1 is updated is provided (302). The automotive navigation map provision vendor 10 translates a difference between the old and new original data items ver. 1 and ver. 2 of level 0 (RDBs) (310), and thus produces all-level difference data (a difference between automotive navigation map data ver. 1 and automotive navigation map data ver. 2) for an automotive navigation map (312).

Specifically, unlike an existing method of individually compiling original data items (RDBs) into binary data items, creating automotive navigation map data items on the basis of the binary data items, and then obtaining a difference between the automotive navigation map data items, a difference between the original data items ver. 1 and ver. 2 of level 0 (RDBs) based on which new automotive navigation map data has not been created is obtained first of all. The processing (upper-level translation) of reflecting the difference data between the original data items ver. 1 and ver. 2 of level 0 (RDBs) on all relevant upper levels is carried out in order to produce all-level difference data ver. 2 (a difference between automotive navigation map data ver. 1 and automotive navigation map data ver. 2) which is needed for a final map. Namely, the final map difference data is obtained by integrating difference data items of the respective levels into one.

In response to a map distribution request issued from the automotive navigation terminal 20, the map distribution server 10 distributes the final map difference data (update elements) 52. The automotive navigation terminal 20 preserves the provided final map difference data in the map data storage unit 31. Based on the data, the map update unit 24 performs updating processing on an automotive navigation map (320).

FIG. 4A to FIG. 4E show examples of table structures for original data ver. 1 (RDB) provided by the map dealer (original data provision vendor) 01, and examples of contents.

FIG. 4A shows the structure of a link shape table 400. The link shape table includes a field in which a link ID with which a link 2 (link 1, 2, etc.) is identified is registered, and a field in which a point string indicating the position and shape of the link (leading node, terminal node, and a deflection point of the link, that is, point-string data which is data of a shape coordinate string of the link) is registered.

FIG. 4B shows the structure of a traffic regulation information table 402. The traffic regulation information table includes a field in which a link ID of a link is registered, and a field in which traffic regulation information concerning the link is registered. A width information table 402 shown in FIG. 4C includes a field in which a link ID of a link is registered, and a field in which width information concerning the link is registered. A road name table 403 shown in FIG. 4D includes a field in which a link ID of a link is registered, and a field in which a road name concerning the link is registered. A miscellaneous road attribute table 404 shown in FIG. 4E includes a field in which a link ID of a link is registered, and a field in which the other road attribute concerning the link or a road type herein is registered. The other road attributes include a link length, the number of lanes, a regulatory speed, a link type, a toll road or not, and so on. These road attributes are also included in tables in original data ver. 1 (RDB).

FIG. 5A to FIG. 5E show examples of structures of tables in original data ver. 2 (RDB) provided by the map dealer (original data provision vendor) 01, and examples of contents. In a link shape table 500 shown in FIG. 5A, point-string data that is data of a link shape coordinate string of a link 2 has been changed from a curve, which is specified in the original data ver. 1 (RDB), to a straight line. The other tables of a traffic regulation information table 501, a width information table 502, a road name table 503, and a miscellaneous road attribute table 504 have not been changed from the data items of the tables in the original data ver. 1. Namely, the link IDs of roads that have not actually been changed remain unchanged between the versions. Therefore, a difference between road data items can be readily extracted.

Figure 6:
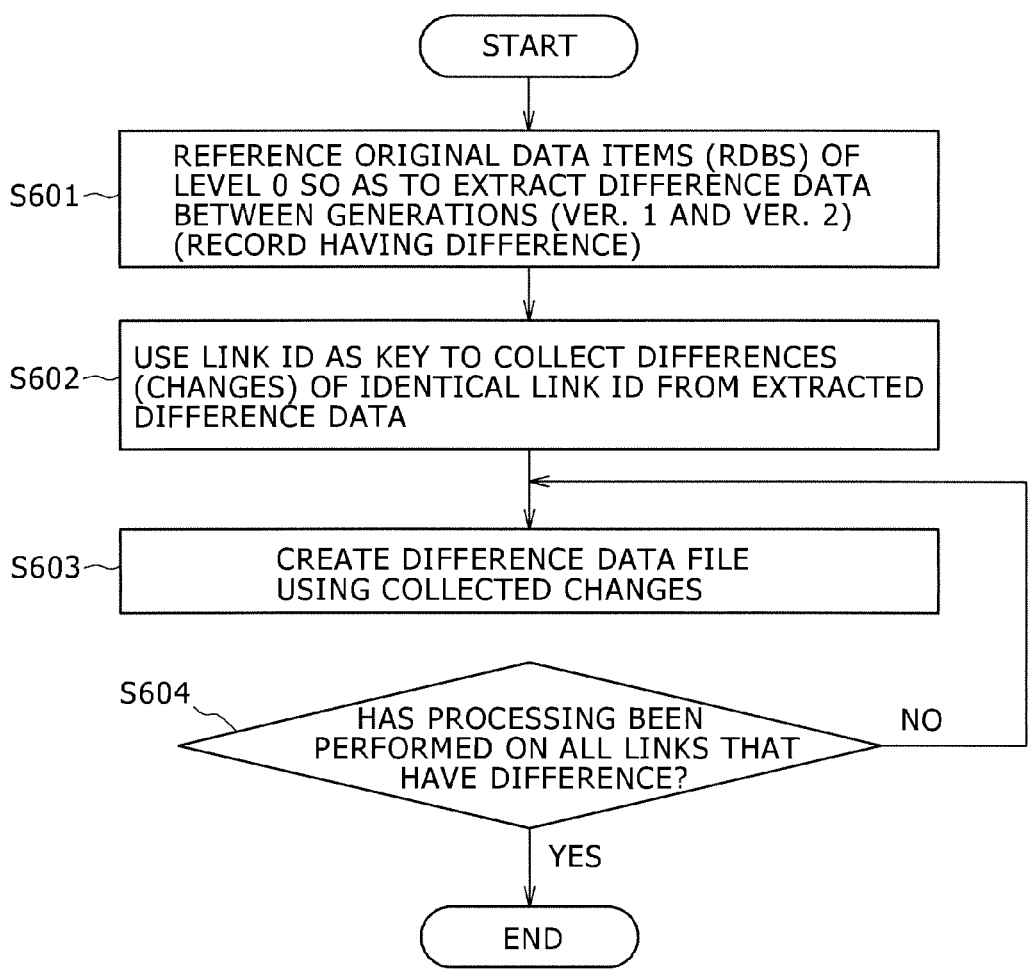
FIG. 6 is a diagram describing a processing flow to be followed by a lowermost-level difference translation unit included in the map distribution server.

FIG. 6 describes a processing flow to be followed by the lowermost level difference translation unit 13 included in the map distribution server 10. Referring to the original data items of level 0 (RDBs) shown in FIG. 4A to FIG. 5E, difference data (a record having a difference) between the different generations ver. 1 and ver. 2 (RDBs) is extracted (S601).

FIG. 7A shows a format of difference data specified in the difference data table (an example of a road link). The format of difference data includes a link ID, shape information, traffic regulation information, width information, a road name, and others. The link ID is used as a key to obtain differences (changes) of the link ID from the extracted difference data, and the differences (changes) are collected (S602). Based on the collected changes, a file of difference data is created (S603). Further, whether the difference data file has been created for all links of level 0 that have a difference is decided (S604). If the processing has been performed on all the links, the processing is terminated. The thus produced difference data files of level 0 are preserved in the difference data storage unit 174.

FIG. 7B shows a file of difference data (example of a road link) that result from translation performed by the lowermost-level difference translation unit 13. In the examples shown in FIG. 4A to FIG. 5E, the record of the link 2 has a difference. Therefore, a difference in shape information concerning the link ID 2 is extracted. The difference data file resulting from the translation is described according to the comma-separated values (CSV) file format in which data values are delimited with a comma. Namely, shape information (positional coordinates) on a road link of the link ID 2, which has a difference in a parcel, is described in hexadecimal notation. As for traffic regulation information or the like, absence of a change is indicated. Difference data (CSV-format data) that signifies additions or deletions and into which difference update data items in the difference data table are integrated is map update data. The CSV-format data is data whose only difference from automotive navigation map data or difference data preserved in the automotive navigation map data storage unit 173 or map data storage unit 31 is that the data is delimited with a comma. Therefore, the map update data can be readily updated.

Figure 8:
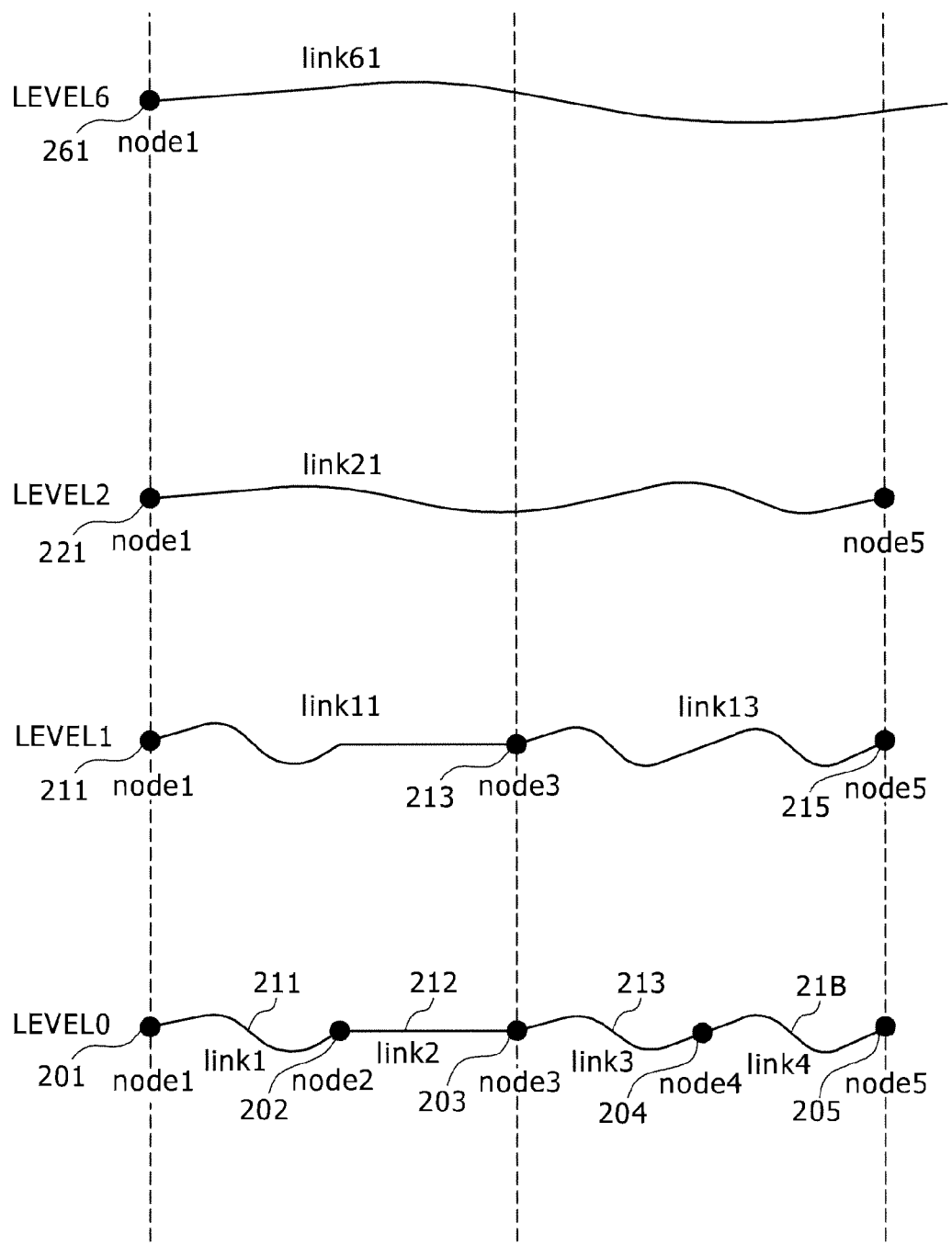
FIG. 8 is a diagram showing an example of association among upper levels and lower levels of one road link in an automotive navigation map.

Difference data specified in the difference data table is update data of a component of an automotive navigation map, for example, one road link. FIG. 8 shows an example of association among upper levels and lower levels in an automotive navigation map of a road link that is one component.

At level 0, between nodes 201 and 205 at the ends of one road link, there are nodes 202, 203, and 204 and four links 1, 2, 3, and 4 211, 212, 213, and 214 that link the nodes. At level 1 that is an immediately upper level, between nodes 211 and 215 at the ends of one road, there are a node 213 and two links 11 and 13 that link the nodes. At level 2 that is an immediately upper level, nodes 221 and 225 at the end of one road are connected to each other with one link 21, and no node is existent intermediately. At level 6 that is the uppermost level, there are a node 261 at one end of a road and one link 61 connected to the node. The other end of the link 61 is extended to outside the drawing.

Herein, each of the links at level 1 to level 6 includes, for example, the link 2 of level 0 as the lower-level link. If the link 2 is modified, the modification affects the relevant links 11, 21, etc., and 61 of the upper levels 1 to 6. A link ID association table of level 0 to upper levels (N) (upper/lower link association table) in which link IDs of level 0 are associated with link IDs of upper levels (N) is produced at the same time when an automotive navigation map is created, and preserved in the difference data storage unit 174 of the storage device.

The data (CSV-format data) of a difference in shape information extracted in relation to the link ID 2 and shown in FIG. 7B is reflected on the relevant links of the upper levels 6 to 6 by utilizing the upper/lower link association table. This processing is performed by the upper-level difference translation unit 14 included in the map distribution server 10.

Figure 9:
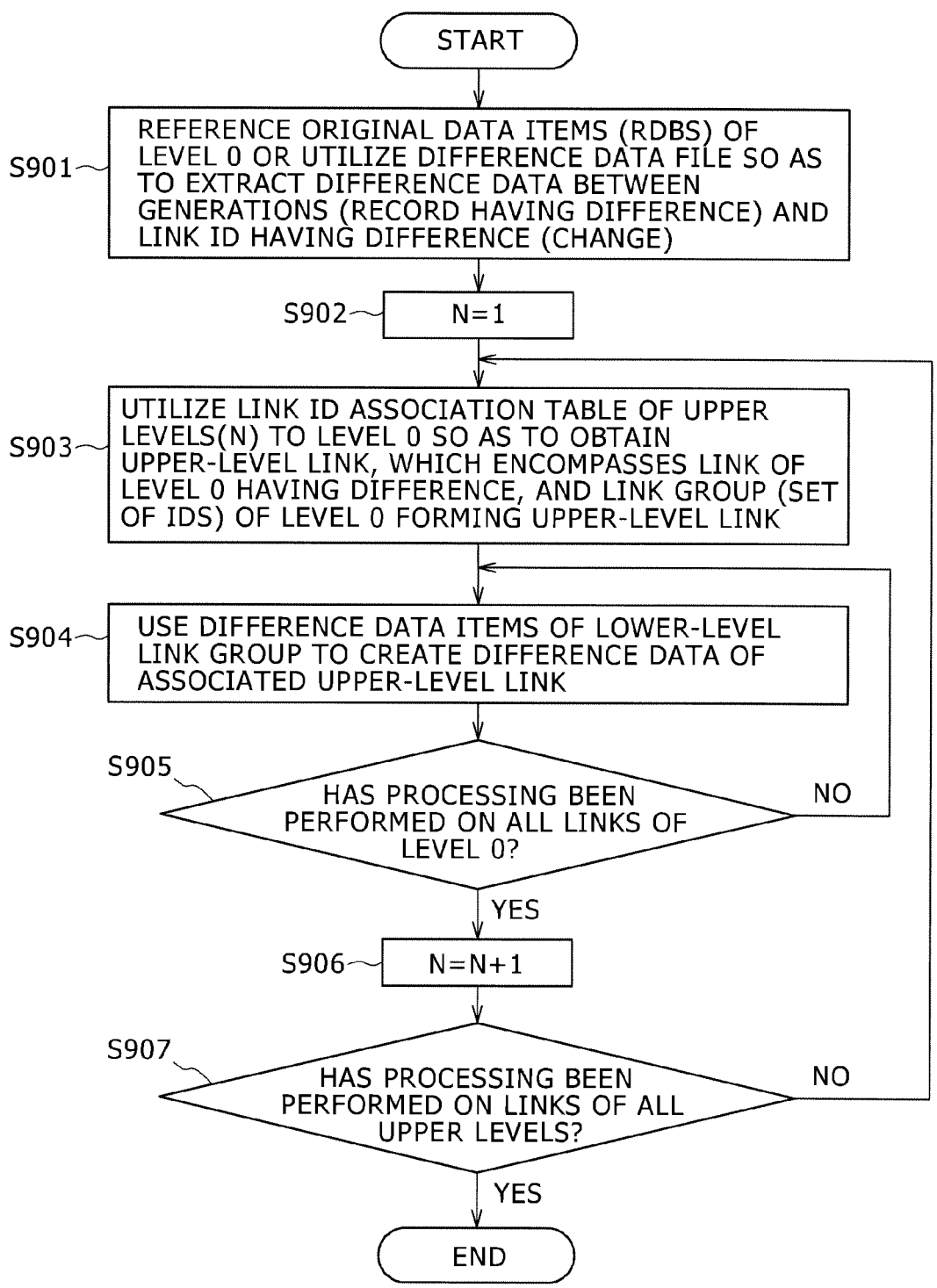
FIG. 9 is a diagram describing a processing flow to be followed by an upper-level difference translation unit included in the map distribution server shown in FIG. 1.

FIG. 9 shows a processing flow to be followed by the upper-level difference translation unit 14 included in the map distribution server 10 shown in FIG. 1.

To begin with, original data items (RDBs) of level 0 are referenced or a difference data file is utilized in order to extract difference data between generations (record having a difference) and a link ID having a difference (change) (S901). For example, the link ID 2 in FIG. 7B is extracted. Thereafter, 1 is set for N (S902). In relation to level 1, the link ID association table is used to obtain an upper-level link, which encompasses the link of level 0 having a difference, and a link group (a set of IDs) of level 0 forming the link (S903). For example, in FIG. 8, the link 11 is obtained as a link of level 1 that encompasses the link 2 of level 0, and the link group (set of IDs) forming the link 11 is obtained. Thereafter, difference data (CSV-format data) of the associated upper-level link (N=1) is created based on difference data items of the lower-level link group. For example, difference data of the link 11 of level 1 is created based on difference data of the link 2 of level 0 (S904). Specifically, a difference in shape information of level 0 is reflected on each of links of level 1, to which the link 2 of level 0 is related, in order to obtain a difference (CSV-format data) of automotive navigation map data ver. 1 of level 1 relevant to the link 2, whereby automotive navigation map data ver. 2 is created.

As for difference data (update elements) produced by the map distribution server 10, if the data is concerned with, for example, a link, the data is not CSV-format data of an entire link, but represents a difference in any attribute of the link, for example, shape information. In addition, an attribute devoid of difference data is defined as Unchanged (Null).

As mentioned above, processing is performed on all links of level 0 having a difference (S905). Likewise, difference data (CSV-format data) of each of links of upper levels (N+1) is sequentially created, and the same processing is performed on the links of all the upper levels (S906 and S907). Difference data of each level represents a difference in each attribute of a link. An attribute devoid of difference data is defined as Unchanged. Difference data items of the respective levels are integrated over all the levels needed for a final map, whereby all-level difference data is produced. The all-level difference data is preserved in the difference data storage unit 174 as final map difference data for an automotive navigation map.

An area to be an object of updating processing can be designated with a link ID or any other ID with which a minimal component of an automotive navigation map is identified. The link ID association table (upper/lower link association table) of upper levels (N) relative to level 0 is used to designate a link ID of an upper-level link associated with a lower-level link that has changed, and the change is produced as difference data. Thus, processing can be performed efficiently.

In the example shown in FIG. 8, a change in the shape of the link 2 of level 0 is related to all of levels 1 to 6. Therefore, a difference of automotive navigation map data ver. 1 of each of the levels 1 to 6 is obtained by referencing to the upper/lower link association table, whereby automotive navigation map data ver. 2 is created. In other words, the automotive navigation map data ver. 2 on which the difference in shape information of level (CSV-format data) has been reflected is created for each of the links of the relevant levels 1 to 6.

Although, for example, the link 1 of level 0 in FIG. 8 has not been changed, data of the link 1 is needed to produce difference data of the link 11 of the upper level 1. Likewise, although the links 3 and 4 of level 0 have not been changed, data items of the links 3 and 4 are needed to produce difference data of the link 21 of the upper level 2.

FIG. 10 shows a link level association table 1000 listing links of levels 1 to 6 that should be subjected to difference data production processing during to be performed by the upper-level difference translation unit 14. As listed in the link level association table 1000, for each of the links of levels 1 to 6, a difference data file on which difference data of the record of the link 2 of level 0 is reflected is produced. Namely, a difference of data ver. 1 of a relevant link of each of upper levels is obtained based on CSV-format difference data of the record of the link 2 (see FIG. 7B), whereby data ver. 2 of the link is created in order to produce final map difference data (CSV-format data).

Normally, express ways, national open roads, major local roads, or the like have a hierarchical structure ending with level 6, while municipal roads have a hierarchical structure ending with an intermediate level. Assuming that the road links shown in FIG. 8 express a major local road, as long as any one of links of level 0 has a difference, the difference data is reflected on the relevant upper levels ending with level 6. Accordingly, the link association table 1000 for the upper and lower levels shown in FIG. 10 is updated over all the levels of level 0 to level 6.

The map distribution server 10 distributes final map difference data to the automotive navigation terminal 20 that has issued a map distribution request.

In the automotive navigation terminal 20, the final map difference data provided by the automotive navigation map provision vendor 10 is preserved in the map data storage unit 31. Based on the data, the map update unit 24 performs updating processing on the automotive navigation map data ver. 1 representing an automotive navigation map, updates the map data into automotive navigation map data ver. 2, and preserves the data ver. 2 in the map data storage unit 31. The map data is used for automotive navigation.

In relation to the present embodiment, a description has been made of an example, in which shape information alone has been changed, as an example in which a link attribute is changed. Even when a new road is opened to traffic or a road attribute is modified or deleted, updating processing is performed on automotive navigation map data on the basis of difference data between parcel data concerned of original data (RDB) ver. 1 of level 0 and corresponding parcel data of original data (RDB) ver. 2 of level 0.

As mentioned above, according to the present embodiment, instead of individually compiling original data items (RDBs) into binary data items, creating automotive navigation map data items on the basis of the binary data items, and then obtaining a difference between the map data items, a difference between original data items (RDBs) of level 0 is obtained prior to creation of automotive navigation map data, and all-level (final map) difference update data (CSV-format data) for an automotive navigation map is produced based on the difference between the original data items of level 0. The difference update data is data that is formatted in the same manner as the automotive navigation map data or difference data, which is preserved in the automotive navigation map data storage unit 173 or map data storage unit 31, is, but is delimited with a comma. At each of the levels, data elements of automotive navigation data ver. 1 and those of automotive navigation data ver. 2 are associated with each other on a one-to-one basis. Therefore, difference updating of each level based on CSV-format data can be readily achieved through arithmetic processing.

Difference update data concerning addition of a new road to an automotive navigation map or modification of a road in the map can be produced for a short period of time. For example, the difference update data can be provided for users in one day or so after original data items (RDBs) are received.

Second Embodiment

Next, a second embodiment of the present invention will be described below. As already described, for an automotive navigation map, map data is created for each scale. As original data, only data of the minutest level (level 0) is available. In the first embodiment, difference data of each of levels is produced based on a difference between original data items (RDBs) of level 0, and resultant difference data items are integrated as final map difference data. However, as long as at least map data ver. 2 of level 0 that is the minutest level has undergone any change, difference data items of all levels ending with level 6 are created in order to produce final map difference data, though it depends on a road type. The size of the final map difference data is considerably big.

In the second embodiment, uniformly producing automotive map data items of all levels is quitted. Difference data items of levels ending with a practically necessary level are created based on old and new original map data items of level 0.

Figure 11:
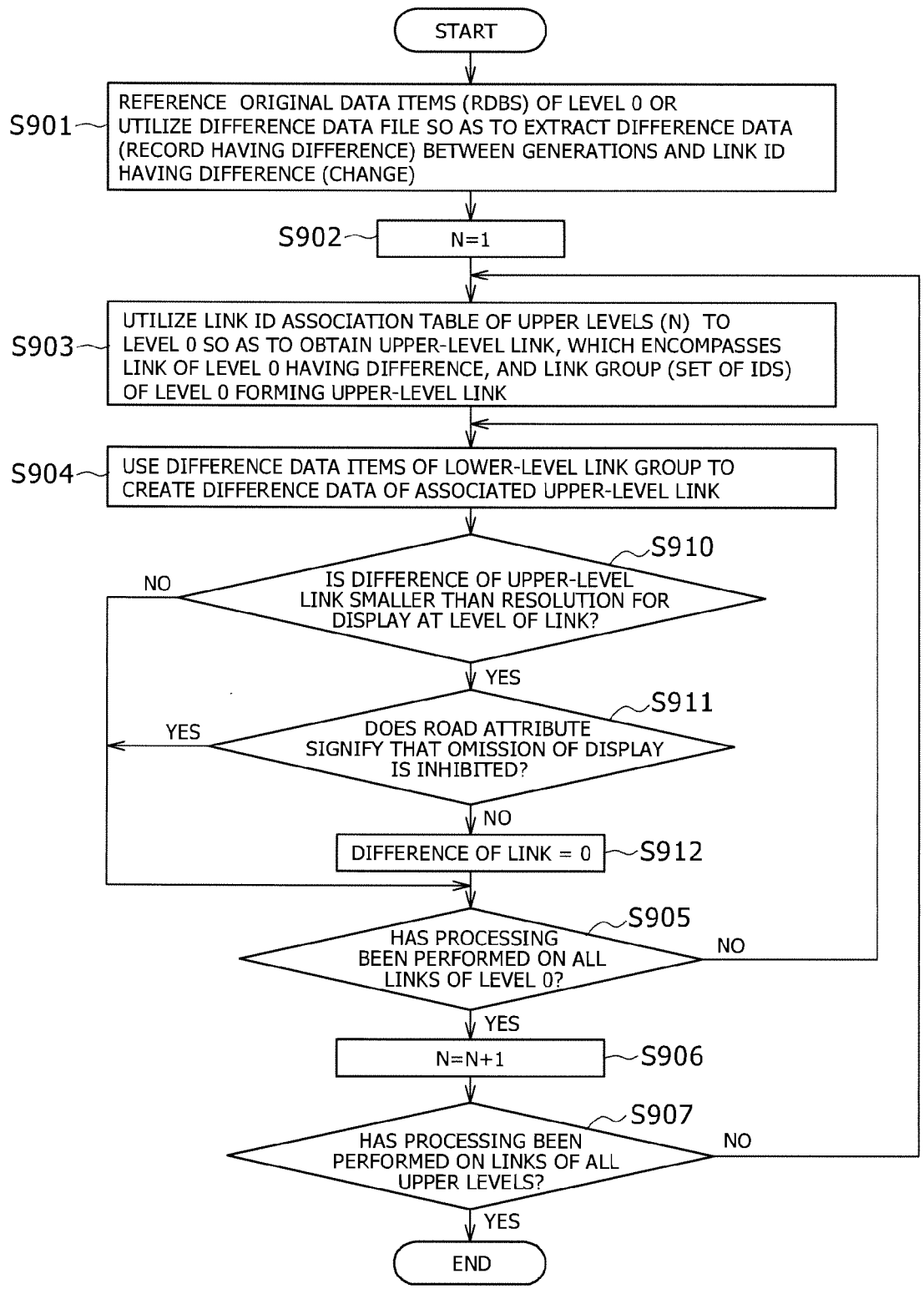
FIG. 11 is a diagram describing a processing flow to be followed by an upper-level difference translation unit in a second embodiment of the present invention.

FIG. 11 shows a processing flow to be followed by the upper-level difference translation unit 14 in the second embodiment. Processing from S901 to S904 for producing difference data of an upper-level link using the upper/lower link association table is identical to that of the first embodiment. The system configuration and processing shown in FIG. 1 to FIG. 8 described in relation to the first embodiment can be applied to the second embodiment as they are.

As described in FIG. 11, whether a difference of an upper-level link associated with a link of level 0 having a difference is smaller than a resolution for display at the level of the link is decided (S910). The resolution for display at each level of links is assigned a predetermined value on the basis of the capability of the display unit 29 of the navigation terminal 20 to display things. Talking of, for example, a difference derived from a change in road shape of the link 2 (see FIG. 4A to FIG. 5E), the difference in the shape is apparent at level 1. However, since the difference at level 2 is smaller than the resolution, even if display is omitted, a user does not find it disadvantageous. As a result of the decision, if the difference is equal to or larger than the resolution, processing identical to that in the first embodiment is performed at S905 and thereafter. In contrast, if a decision is made at S910 that the difference is smaller than the resolution, whether a road attribute signifies that omission of display is inhibited is decided (S911). If omission is inhibited, processing identical to that in the first embodiment is performed at S905 and thereafter. If a decision is made at S911 that omission of display is not inhibited, the difference of the link is set to 0 (Null) (S912). Specifically, processing is performed so that a difference smaller than the resolution for display is not reflected on display. A degree of importance of display of a road attribute depends on a route searching feature of an automotive navigation system. Therefore, an upper level at which omission of display is inhibited is not uniformly determined.

Figures 12, 13:
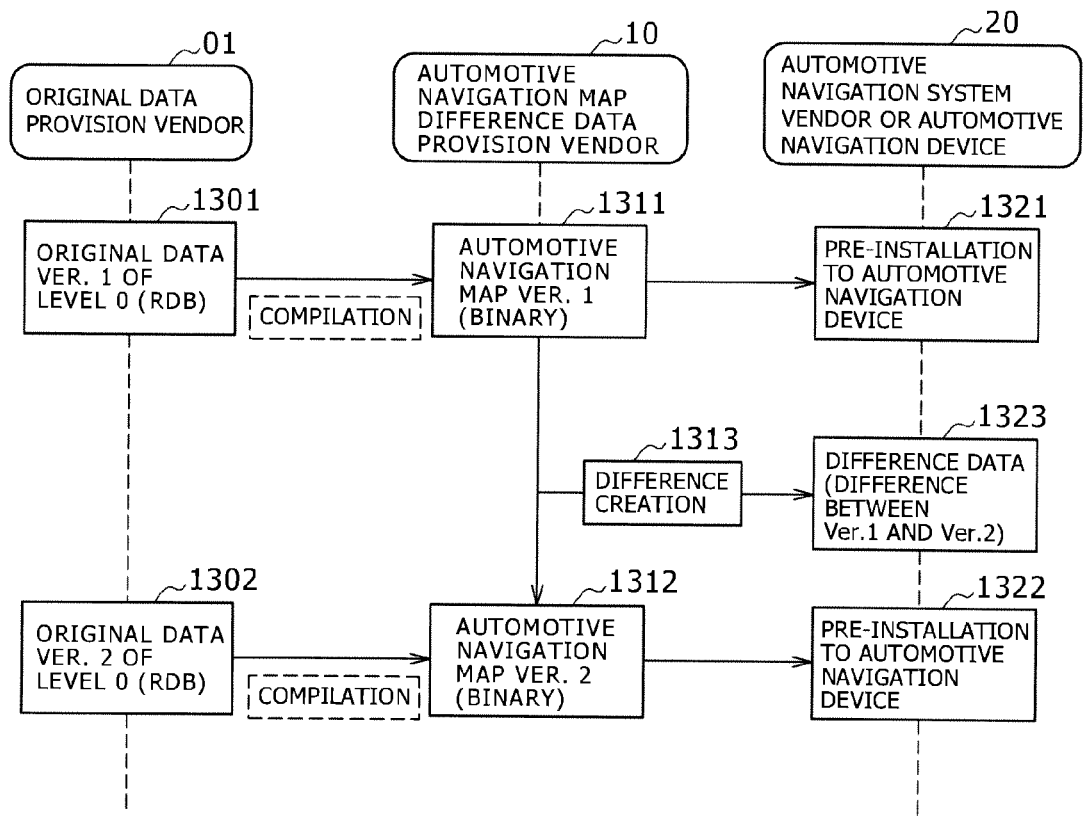
FIG. 12 is a diagram showing an example of an upper/lower-level link association table resulting from the processing described in FIG. 11.
FIG. 13 is a diagram showing an example of an existing update data creation system for an automotive navigation map.

FIG. 12 shows a link level association table 1200 resulting from the processing described in FIG. 11 and performed on the example shown in FIG. 8. As apparent from comparison with the link level association table 1000 shown in FIG. 10, differences of links of level 2 and upper levels are set to 0 (Null). Therefore, final map difference data (CSV-format data) is produced by integrating differences of links of level 0 between original data items ver. 1 and ver. 2 and created differences of links of level 1. The final map difference data is not outputted with respect to level 2 and upper levels.

As mentioned above, if a difference is decided to be smaller than a resolution and a road attribute is decided to signify that the display thereof may be omitted, the difference is excluded from objects of display. Difference data items of practically necessary levels are created. Accordingly, the size of final map difference data can be reduced.

According to the present embodiment, a difference of a relevant upper level can be created directly from difference data between original map data items (RDBs) of the minutest level (level 0). Attributes specified for upper-level link data are basically identical to those specified for a lower level. If a road shape alone is modified as it is in the example shown in FIG. 8, thinning is performed according to a resolution in order to produce difference data of each of levels. Resultant difference data items are integrated in order to produce final map difference data.

Unlike the first embodiment, it is unnecessary to create automotive navigation map data items of all levels. Final map difference data can therefore be more efficiently produced. Namely, the time required for creating difference update data items can be shortened. Since the present method requires only difference data items concerning an attribute whose value is changed, the size of the final map difference data can be reduced. Therefore, difference update data items stemming from addition of a new road to an automotive navigation map or change of a road in the map can be created for a shorter period of time. For example, when a new road is opened to traffic, as soon as data of the new road is supplied from an original data provision vendor, update data items can be immediately distributed to users. Eventually, the user-friendliness of an automotive navigation system improves.

What is claimed is:

1. A map distribution server that produces automotive navigation map data for automotive navigation systems, comprising:
a lowermost-level difference translation unit; and
an upper-level difference translation unit, wherein
an automotive navigation map is represented by network data in which roads are expressed with links and intersections are expressed with nodes;
automotive navigation map data has a multilevel structure in which the links are associated with one another among a minutest level and a plurality of other levels which are different from the minutest level in scale;
the automotive navigation map data includes minutest-level map data representing links of the minutest level and other-levels map data representing links of each of the plurality of other levels;
the lowermost-level difference translation unit is configured to produce relational database (RDB)-form difference data of the minutest level from RDB-form original data items including old and new map data items of the minutest level, the produced RDB-form difference data of the minutest level representing difference between the old data items of the minutest level and the new data items of the minutest level; and
the upper-level difference translation unit is configured to:
translate the difference data of the minutest level into translated data,
produce difference data of each of levels of the multilevel structure that are related to the difference data of the minutest level, on the basis of the translated data and information on a relationship of association among the links of upper and lower of the levels of the automotive navigation map data,
integrate the produced difference data, and
produce, based on the integrated difference data, final map difference data for the automotive navigation map; and
the server is configured to control an automotive navigation system to update an automotive navigation map based on the final difference data.

2. The map distribution server for automotive navigation systems according to claim 1, wherein the difference data produced by the lowermost-level difference translation unit and the final map difference data produced by the upper-level difference translation unit are Comma Separated Value (CSV)-format data items.

3. The map distribution server for automotive navigation systems according to claim 2, wherein
the RDB-form original data of the minutest level includes information concerning each of road attributes of each of the links, and
the final map difference data is data produced based on a difference in a road attribute between the old and new original data items.

4. The map distribution server for automotive navigation systems according to claim 3, further comprising a storage unit, wherein:
based on a difference between the original data items of the minutest level preserved in the storage unit, the upper-level difference translation unit is configured to create CSV-format automotive navigation map data of each of the levels that are related to the difference data of the minutest level, and produce, based on the CSV-format automotive navigation map data, difference data of each of the levels for the automotive navigation map.

5. The map distribution server for automotive navigation systems according to claim 4, wherein:
   a link ID identifying a minimal component of the automotive navigation map is assigned to each of the links of the multilevel structure, the link IDs of the links of the multilevel structure are used to produce an upper/lower link association table indicating a relationship of association among lower-level links and upper-level links of the multilevel structure, and the upper/lower link association table is preserved in the storage unit; and
   for production of difference data, the upper-level difference translation unit is configured to produce, based on the upper/lower link association table, difference data items of all levels of the multilevel structure that are related to the difference data of the minutest level for the automotive navigation map, and integrate the difference data items as the final map difference data for the automotive navigation map.

6. The map distribution server for automotive navigation systems according to claim 4, wherein:
   a link ID identifying a minimal component of the automotive navigation map is assigned to each of the links of the multilevel structure, the link IDs of the links of the multilevel structure are used to produce an upper/lower link association table indicating a relationship of association among lower-level links and upper-level links of the multilevel structure, and the upper/lower link association table is preserved in the storage unit; and
   the upper-level difference translation unit is configured to:
      produce, on the basis of a difference between the original data items of the minutest level, difference data items of each of the levels other than the minutest level from a link, which has a difference, and
      integrate the difference data items as the final map difference data for the automotive navigation map.

7. The map distribution server for automotive navigation systems according to claim 6, wherein for production of difference data, the upper/lower link association table is used to produce, as difference data, a change of an upper-level link that is associated with a changed part of a lower-level link.

8. The map distribution server for automotive navigation systems according to claim 7, wherein:
   the upper-level difference translation unit is configured to determine whether a difference between the upper-level link and the lower-level link is smaller than a resolution of a display unit of an automotive navigation system; and
   when it is determined that the difference is smaller than the resolution, the upper-level difference translation unit is configured to omit display of a difference of an upper level, and produce difference data of each of the levels for the automotive navigation map.

9. The map distribution server for automotive navigation systems according to claim 8, wherein:
   the original data of the minutest level includes information concerning each of a plurality of road attributes of each of the links that are components of the automotive navigation map;
   the final map difference data is data based on a difference in a road attribute between the old and new original data items; and
   when omission of display concerning the road attributes is inhibited, display of the difference of the upper level is not omitted but the difference data of each of the levels for the automotive navigation map is produced.

10. A map data distribution system, comprising:
    a map distribution server including a lowermost-level difference translation unit and an upper-level difference translation unit; and
    an automotive navigation terminal that is provided with an automotive navigation map by the map distribution server over a network, wherein
    the automotive navigation map is represented by data having a multilevel structure that includes a minutest level and a plurality of other levels which are different from the minutest level in scale;
    the automotive navigation map data includes minutest-level map data representing links of the minutest level and other-levels map data representing links of each of the plurality of other levels;
    the lowermost-level difference translation unit is configured to produce relational database (RDB)-form difference data of the minutest level from RDB-form original data items including old and new map data items of the minutest level, which are provided by a map dealer, the produced RDB-form difference data of the minutest level representing difference between the old data items of the minutest level and the new data items of the minutest level:
    the upper-level difference translation unit is configured to:
       translate the difference data of the minutest level into translated data,
       produce difference data of each of the levels of the multilevel structure on the basis of the translated data and information on a relationship of association among links of upper and lower of the levels of the automotive navigation map data, and
       integrate the produced difference data as final map difference data for the automotive navigation map;
    the map distribution server is configured to:
       distribute, in response to a map distribution request issued from the automotive navigation terminal, the final map difference data to the automotive navigation terminal; and
       control the automotive navigation terminal to perform updating processing on the automotive navigation map on the basis of the final map difference data, which is provided by the map distribution server, and old-generation data of the automotive navigation map which the automotive navigation terminal holds.

11. The map data distribution system according to claim 10, wherein the difference data produced by the lowermost-level difference translation unit and the final map difference data produced by the upper-level difference translation unit are Comma Separated Value (CSV)-format data items.

12. The map data distribution system according to claim 11, wherein:
    the RDB-form original data of the minutest level includes information concerning each of attributes of each of links that are components of the automotive navigation map;
    the map distribution server is configured to determine whether a difference of an upper-level link from the link of the minutest level is smaller than a resolution of a display unit of an automotive navigation system; and
    when it is determined that the difference is smaller than the resolution, the map distribution server is configured to omit display of a difference of a upper-level link, and produce difference data of each of the levels for the automotive navigation map.

13. A road difference data production method for producing automotive navigation map data for automotive navigation systems in a map distribution server, the map distribution server including a lowermost-level difference translation unit configured to produce difference data of a minutest level of an relational database (RDB) form, and an upper-level difference translation unit configured to produce difference data of each of levels of a multilevel structure, an automotive navigation map being represented by network data in which roads are expressed with links and intersections are expressed with nodes, and the automotive navigation map data having the multilevel structure in which the links have a relationship of association with one another among the minutest level and a plurality of other levels which are different from the minutest level in scale, and the automotive navigation map data including minutest-level map data representing links of the minutest level and other-levels map data representing links of each of the plurality of other levels, the road difference data production method comprising the steps of:

producing RDB-form difference data of the minutest level from original data items including old and new RDB-form map data items of the minutest level, the produced RDB-form difference data of the minutest level representing difference between the old data items of the minutest level and the new data items of the minutest level;

translating the difference data of the minutest level into translated data;

producing, as road difference data, difference data items of the respective levels of the multilevel structure on the basis of the translated data and information on the relationship of association among the links of upper and lower of the levels of the automotive navigation map data;

producing final map difference data for the automotive navigation map; and controlling, by the map distribution server, an automotive navigation system to update the automotive navigation map based on the final difference data.

14. The road difference data production method according to claim 13, wherein the difference data produced by the lowermost-level difference translation unit and the final map difference data are Comma Separated Value (CSV)-format data items.

15. The road difference data production method according to claim 14, wherein the RDB-form original data of the minutest level includes information concerning each of road attributes of each of the links, and the final map difference data is data produced based on a difference in a road attribute between the old and new original data items.

* * * * *